United States Patent [19]

Anacreon

[11] Patent Number: 4,717,935
[45] Date of Patent: Jan. 5, 1988

[54] ELECTRONIC TRIM CONTROL FOR DUAL-PHOTODETECTOR EXPOSURE CONTROL SYSTEM

[75] Inventor: Robert V. Anacreon, Natick, Mass.
[73] Assignee: Polaroid Corporation, Cambridge, Mass.
[21] Appl. No.: 764,205
[22] Filed: Aug. 9, 1985
[51] Int. Cl.[4] ............................................. G03B 15/05
[52] U.S. Cl. ................................... 354/417; 354/420; 354/483
[58] Field of Search ............... 354/417, 420, 422, 433, 354/434, 436, 437, 483, 79

[56] References Cited

U.S. PATENT DOCUMENTS

| | | | |
|---|---|---|---|
| 3,620,143 | 11/1971 | Burgarella | 95/10 C |
| 3,942,183 | 3/1976 | Whiteside | 354/29 |
| 4,023,187 | 5/1977 | Shenk | 354/27 |
| 4,199,244 | 4/1980 | Shenk | 354/195 |
| 4,199,246 | 4/1980 | Muggli | 354/195 |
| 4,209,243 | 6/1980 | Johnson et al. | 354/30 |
| 4,255,030 | 3/1981 | Johnson et al. | 354/27 |
| 4,279,487 | 7/1981 | Baker et al. | 354/79 |
| 4,384,773 | 5/1983 | Hambly | 354/29 |
| 4,445,763 | 5/1984 | Whiteside | 354/417 |

Primary Examiner—Russell E. Adams
Attorney, Agent, or Firm—John J. Kelleher

[57] ABSTRACT

A photographic camera of the type having a quench-type strobe, a scanning blade shutter and an exposure control system having separate ambient and artificial light sensing devices for establishing distinct signals representative of the amount of ambient and artificial light illuminating a particular scene, is provided with a unitary, manually operable electronic trim control for simultaneously varying both of these signals, to a limited degree, to compensate for variations in ambient scene lighting conditions and/or slight variations in the sensitometric characteristics of a photographic film. The electronic trim control system includes a common voltage source capable of providing a plurality of different magnitude trim voltages for regulating both ambient and artificial scene light levels. The electronic trim control couples a manually selected common trim voltage corresponding to desired ambient and artificial scene light levels to shutter and strobe control circuitry for ambient and strobe light control purposes.

11 Claims, 4 Drawing Figures

ELECTRONIC TRIM CONTROL FOR DUAL-PHOTODETECTOR EXPOSURE CONTROL SYSTEM

BACKGROUND OF THE INVENTION

The present invention relates to an exposure control system for a photographic camera of the type employing both a scanning blade shutter and a quench-type strobe, in general, and to a manually operable trim system for electronically controlling the aperture form by said shutter and the strobe light levels in such a camera, in particular.

Automatic exposure control systems have been incorporated within various amateur cameras for simplifying their operation by minimizing the pre-exposure adjustments to be made by a camera operator. These exposure control systems function to automatically regulate the exposure parameters for a given scene. Generally, the exposure control systems are designed for use over a wide range of scene lighting conditions.

Exposure control systems embodying scanning shutter blade elements which operate to vary the exposure aperture areas with time during an exposure interval are well known as indicated by U.S. Pat. No. 3,942,183 entitled "Camera with Pivoting Blades", by G. WHITESIDE, issued Mar. 2, 1976, in common assignment herewith. Such scanning shutter blade mechanisms generally include a pair of counter-reciprocating shutter blade elements, each having a primary aperture that transverses the optical axis of the camera during the exposure interval. The primary apertures are shaped so that upon overlying one another during counter movement of the blades, there is defined an effective exposure aperture value which increases to a maximum value in a determinate period of time.

Exposure control is provided by a pair of secondary photocell apertures and respective shutter blade elements which admit scene light to a photoresponsive element in correspondence with the scene light admitted to the focal plane during shutter blade movement through an exposure cycle. The output from the photoresponsive element is directed to an integration circuit which triggers upon reaching an integration level corresponding to a desired exposure value to terminate the exposure interval by returning the shutter blade elements back to their initial scene light blocking position.

Such exposure control systems may be utilized with a source of artificial illumination such as an electronic flash to provide artificial illumination not only during conditions of low ambient scene light intensity, but also under conditions of high ambient scene light intensity wherein it becomes desirable to provide the artificial illumination to fill-in the photographic subject against a partly lit scene as disclosed in U.S. Pat. No. 4,023,187, entitled "Exposure Control System with Fill Flash Race Condition", by E. SHENK, issued May 10, 1977, in common assignment herewith.

Since a large majority of amateur pictures are taken within the range of light levels to which the control system is suited, well-exposed photographs are obtained. However, the camera operater may wish to take a photograph which is lightened or darkened to his personal taste, or may wish to accommodate for unusual lighting effects such as backlighting, highlights or the like. In order to adjust the automatic exposure control system for such unusual scenes or effects, a lighten-darken trim is provided. These trim systems provide the user with a manual one-half to one stop optional exposure adjustment above or below the exposure value otherwise established automatically. Ideally, such trim control should be provided with only one manually adjustable component for ambient and artificial light level control. Should a dual trim system for ambient and artifical light (flash) modes be provided having more than one control element, a camera operator may become confused or overlook a requirement for providing trim control for that mode of operation which he is currently using.

In one trim control mechanism disclosed in U.S. Pat. No. 4,209,243, issued June 24, 1982, to B. JOHNSON and G. WHITESIDE, the amount of scene light admitted to the focal plane of a camera is dependent upon the amount of light passing from the scene to a photoresponsive element through a variable density filter slidably mounted on the camera body that varies the amount of scene light "seen" by said photoresponsive element. Normal exposure of photographic film in the camera will result when a medial density portion of the filter is positioned in front of the cell. Correspondingly, the exposure control system may be trimmed to either an underexposure mode upon movement of the slide to reduce the filter density and thus increase the light "seen" by the cell to a value above that indicated for normal exposure, or to an overexposure mode by moving the slide in the opposite direction to increse filter density and thus reduce the amount of light "seen" by the cell to a value below that which would pass the filter for normal exposure. However, because of the degree of precision required for an exposure control system, the limitations on the space available for the overall exposure control system and the importance of the trim mechanism to overall camera effectiveness, there is a need for structural simplicity, reliability and manufacturing cost effectiveness in trim mechanisms of this type. A trim control employing a slidable filter and photosensitive element combination does not adequately satisfy these requirements.

It is a primary object of the present invention, therefore, to provide an electronic trim control for a photographic camera that is structurally simple, reliable and cost effective.

It is another object of the present invention to provide an electronic trim control for a photographic camera of the type having a quench-type strobe, a scanning blade shutter and means for sensing ambient and artificial scene light.

It is a further object of the present invention to provide an electronic trim control for a photographic camera of the type having a quench-type strobe, a scanning blade shutter and a pair of scene light sensing photosensitive elements for establishing distinct signals representative of ambient and artificial scene light levels.

Other objects, features and advantages of the present invention will be readily apparent from the following detailed description of a preferred embodiment thereof taken in conjunction with the accompanying drawings.

SUMMARY OF THE INVENTION

In accordance with the present invention, an exposure control system for a photographic camera of the type having a quench-type strobe, a pair of aperture-forming scanning-type shutter blade elements and means for establishing distinct signals representative of the amount of ambient and artificial light illuminating a particular scene is provided with a unitary, manually operable electronic trim control for varying the degree of strobe or shutter blade control by said exposure control system. The exposure control system includes shutter and quench strobe control means for generating independent signals representative of ambient and strobe scene light levels. The electronic trim control includes a common voltage source that provides a plurality of manually selectable, different magnitude trim voltages. A voltage selector couples a selected one of said trim voltages to said shutter and quench strobe control means for the purpose of varying the said electrical signals representative of ambient and strobe light levels to thereby simultaneously adjust the amount of ambient and/or strobe scene light admitted to the focal plane of said camera to the particular level desired by a camera operator.

DESCRIPTION OF THE PREFERRED EMBODIMENTS

Figure 1:
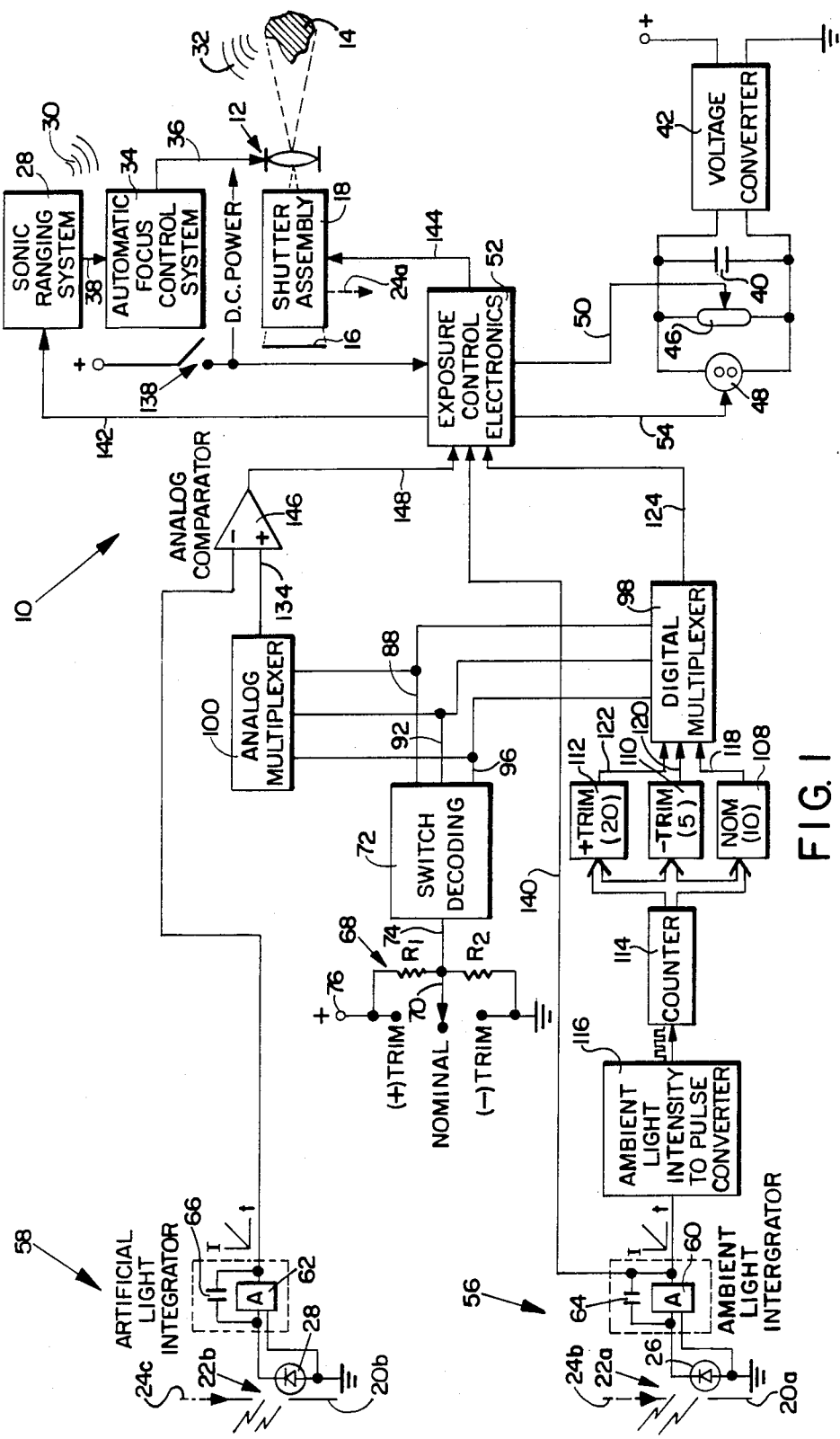
FIG. 1 is a schematic diagram of an exposure control system incorporating a preferred embodiment of the electronic trim control of the present invention.

Referring now to the drawings, and specifically to FIG. 1, there is shown a schematic diagram of an exposure control system incorporating the preferred embodiment of the electronic trim control of the present invention. Camera 10, incorporating said control system, includes an objective or taking lens 12 comprising a plurality of elements retained in spaced relation by a conventional cylindrical lens mount which may be adapted in a well-known manner to provide translational movement of the elements of lens 12 along a central optical axis for focusing image-carrying light rays of, for example, object 14 on film plane 16 through an aperture formed in shutter assembly 18.

Shutter assembly 18, positioned intermediate of lens 12 and film plane 16, includes a pair of overlapping shutter blade elements of the "scanning" type, small portions of which are schematically shown at 20a and 20b. A scene light admitting primary aperture (not shown) is provided in each of said shutter blade elements to cooperatively define a progressive variation of effective aperture openings in accordance with simultaneous longitudinal and lateral displacement of one blade element with respect to the other blade element in a manner more fully described in U.S. Pat. No. 3,942,183, supra, now specifically incorporated herein by reference. The blade element apertures are selectively shaped so as to overlap the central axis of lens 12 thereby defining a gradually varying effective aperture size as a function of the position of the blade elements of shutter assembly 18. Drive means are provided for displacing the blade elements that include a tractive electromagnetic device in the form of a solenoid (not shown) employed to displace the shutter blade elements with respect to one another in a manner more fully described in the above-noted WHITESIDE patent.

Each of the shutter blade elements additionally includes two secondary apertures (not shown in detail) with an aperture in one blade element cooperating with an aperture in another blade element to form a pair of openings 22a, 22b therethrough. These secondary apertures may be configured to track in a predetermined corresponding relationship with respect to the scene light admitting primary apertures (not shown) within shutter assembly 18. With the primary and secondary apertures being formed in the same blade elements and therefore being mechanically coupled to one another through paths 24a, 24b and 24c, it is readily apparent that the secondary apertures can move in the same manner as the primary apertures when controlling scene light passing through secondary-aperture-formed openings 22a and 22b, transmitted from a scene being photographed to photoresponsive elements 26 and 28, respectively. An example of scanning blade elements having primary and secondary apertures that cooperate to control the amount of scene light admitted to a single photosensitive element is shown in U.S. Pat. No. 3,942,183, supra.

Photographic camera 10 is provided with a sonic ranging system that includes a ranging circuit and an ultrasonic transducer (not shown) which may be actuated to transmit a burst of sonic energy 30 toward a subject to be photographed such as subject 14. The transducer thereafter operates to detect an echo 32 of said burst of sonic energy reflected from said subject 14. The total round trip time for a burst of sonic energy to be transmitted toward and an echo thereof to be reflected from subject 14 and detected by said transducer, is a fairly accurate measure of camera-to-subject distance. An electrical signal representative of this round trip time is subsequently employed to focus adjustable focus lens 12. U.S. Pat. No. 4,199,246 to J. MUGGLI describes such a sonic rangefinder in much greater detail. Automatic focus control system 34, coupled to adjustable focus lens 12 through path 36, causes lens 12 to focus an image of subject 14 on film plane 16 during an exposure interval in response to an electrical signal from sonic ranging system 28 through path 38, a signal representative of the distance to said subject 14. An example of an automatic focus control system functioning in this manner is more fully described in U.S. Pat. No. 4,199,244 to E. SHENK.

Camera 10 is provided with an electronic flash together with means for controlling the energizing of same to provide a portion of the exposure value required to illuminate a scene to be photographed. The electronic flash apparatus comprises a main storage capacitor 40 which may be charged up to an operating voltage by any conventional voltage converter circuit as shown at 42. Voltage converter 42 operates in a conventional manner to convert a dc voltage as may be derived from the camera's battery (not shown), which can be in the order of 6 volts, to a suitable operative voltage such as 350 volts. A flash tube 46 and a quench tube 48 for interrupting the flash discharge of flash tube 46 are connected in a parallel relation with respect to storage capacitor 40. Flash tube 46 may be ignited by a suitable trigger signal on path 50 from a conventional trigger circuit (not shown) within exposure control electronics module 52, and quench tube 48 may be ignited by a suitable trigger signal on path 54 from another conventional trigger circuit (not shown) that is also included within said exposure control electronics module 52.

Camera 10 also includes ambient scene light detector and integrator device 56 and artificial scene light detector and integrator device 58. Each of these devices include a differential operational amplifier 60 or 62 and a photoresponsive element 26 or 28 connected across the input terminals of said amplifiers 60 or 62. When considered ideally, these amplifiers have infinite gain, infinite input impedance and zero output impedance. The input circuitry of amplifiers 60 and 62, however, are structured such that the apparent input impedance "seen" by photoresponsive elements 26 and 28 is substantially zero, thereby functioning in a manner that permits each photoresponsive element to operate in a current mode. Consequently, the current generated by photoresponsive elements 26 and 28 is substantially limited only by its own internal impedance. To accomplish this effect, feedback capacitor 64 is connected between one input terminal of operational amplifier 60 and an output terminal of said amplifier 60, and feedback capacitor 66 is connected between one input terminal of operational amplifier 62 and an output terminal of said amplifier 62.

With the feedback arrangement described, any difference of potential supplied by the photoresponsive elements 26 or 28 across the input terminals to operational amplifiers 60 or 62 will operate to cause a current of opposite polarity to be produced through feedback capacitors 64 or 66. As a consequence, feedback capacitors 64 and 66 provide substantially instantaneous feedback signals of opposite polarity which serves to counteract any differential signal voltage impressed by photoresponsive elements 26 or 28 across the input terminals of amplifiers 60 or 62. Thus, although each operational amplifier has a very high input impedance, photoresponsive elements 26 and 28, when connected in the aforementioned manner, experience only a very low input impedance to the amplifier 60 or 62. Therefore, the current of photoresponsive elements 26 or 28 is directed into feedback capacitors 64 or 66. In this manner, photoresponsive elements 26 and 28 are connected to operate in a constant current mode of operation under conditions of non-varying scene light intensity to provide a substantially linear output response at the output terminal of amplifiers 60 and 62 as is more fully described in U.S. Pat. No. 3,620,143 to J. BURGARELLA, and now specifically incorporated by reference herein in its entirety.

The exposure control system of camera 10 also includes an electronic trim control for regulating the amount of ambient and artificial scene light transmitted to the camera's film plane 16 through the primary apertures of the scanning blade shutter (not shown) included within shutter assembly 18. The desired amount of total scene light is established by the position of manually operable lighten/darken trim control switch 68. Switch 68 is a three position switch having mechanical detents that maintain the position of wiper 70 in the particular switch position selected. The three positions of trim control switch 68 are nominal, (+) trim and (−) trim. In the nominal position, the magnitude of the trim voltage applied to the input of switch position decoding module 72 on path 74 is approximately one-half the voltage supplied to terminal 76 from an external voltage source (not shown), said nominal switch position voltage to module 72 being established by the voltage divider network consisting of equal magnitude resistors $R_1$ and $R_2$. In the (+) trim position of switch 68 the full voltage at terminal 76 is applied to the input of module 72, whereas in its (−) trim position a voltage of approximately zero volts is applied to the input of said module 72. The (+) and (−) trim positions of trim switch 68 increases or decreases the total amount of light admitted to film plane 16 by two-thirds stop, which is slightly more than the minimum change in scene light level that an observer can detect in a finished photograph. Providing a trim control device capable of supplying a range of continuously variable settings above and/or below this level would be confusing and therefore not very helpful to a camera operator. The details of switch position decoding module 72 are schematically illustrated in drawing FIG. 2.

Figure 2:
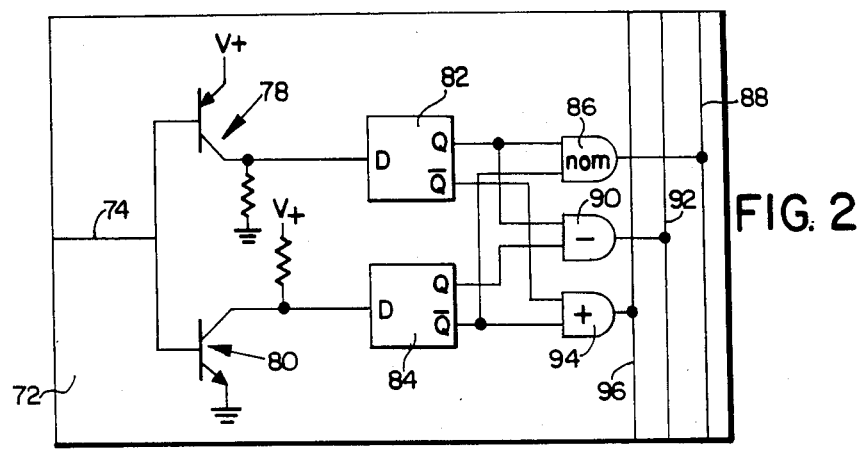
FIG. 2 is a schematic diagram of a portion of the trim switch position decoder functionally shown in drawing FIG. 1.

In FIG. 2, the output from trim control switch 68 on path 74 is applied to the input or base of transistors 78 and 80, transistors that are initially in their off or non-conducting states. If switch 68 is in its nominal position transistors 78 and 80 will be turned on, thereby producing a logical 1 output at Q of monostable gate 82 and at output $\overline{Q}$ at monostable gate 84. In this condition AND gate 86 will be satisfied, thereby producing a logical 1 at the output of said gate 86 and on path 88. If switch 68 is in its (−) trim position, transistor 78 will conduct and transistor 80 will remain off, thereby producing logical 1 outputs at Q of monostable gate 82 and at Q of monostable gate 84. In this condition AND gate 90 will be satisfied, thereby producing a logical 1 at the output of said gate 90 and on path 92. If switch position 68 is in its (+) trim position transistor 78 will remain off and transistor 80 will be in its conducting state, thereby producing logical 1 outputs at $\overline{Q}$ of monostable gate 82 and at $\overline{Q}$ of monostable gate 84. In this condition AND gate 94 will be satisfied, thereby producing a logical 1 at the output of said gate 94 and on path 96. The output of switch position decoding module 72 is simultaneously applied to the inputs of digital multiplexer 98 and analog multiplexer 100. The details of digital multiplexer 98 is schematically illustrated in drawing FIG. 3.

Figure 3:
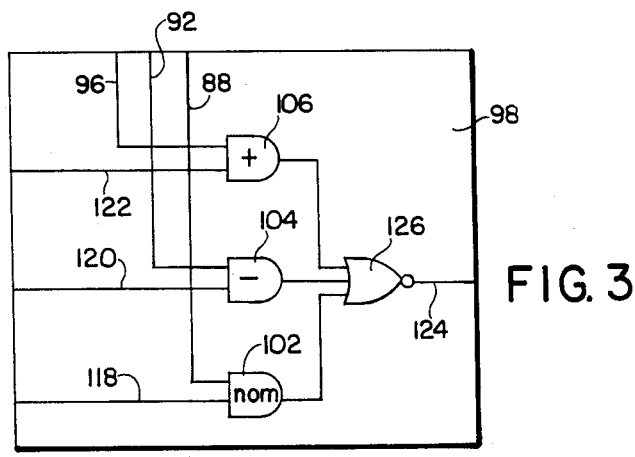
FIG. 3 is a schematic diagram of a portion of the digital multiplexer functionally shown in drawing FIG. 1.

As shown in drawing FIG. 3, the outputs from switch position decoding module 72 on paths 88, 92 and 96 are applied to a single input of AND gates 102, 104 or 106, respectively. The other inputs to AND gates 102, 104 and 106 in digital multiplexer 98 are derived from digital comparators 108, 110 and 112, respectively, shown in drawing FIG. 1. Digital comparators 110, 108 and 112 have 5, 10 and 20 counts, respectively, digitally stored therein. Counts from pulse counter 114 are simultaneously applied to the inputs of said comparators 108, 110 and 112. The counts in pulse counter 114 are derived from conventional A/D converter 116 that converts analog voltage levels derived from photodetector and integrator 56 representative of a particular ambient scene light intensity to a number of pulses corresponding to said particular scene light level. An A/D converter similar to A/D converter 116 is more fully described in U.S. Pat. No. 4,384,773 to HAMBLEY. There is an output (logical 1) from digital comparators 108, 110 and 112 whenever the number of counts at their respective inputs equals the number of counts stored therein. Outputs from digital comparators 108, 110 and 112 are applied to the inputs of AND gates 102, 104 and 106 within digital multiplexer 98 on path 118, 120 and 122, respectively. When AND gates 102, 104 or 106 are satisfied by inputs from switch position decoding module 72 and digital comparators 108, 110 or 112, there is an output on path 124 (logical 0) through NOR gate 126.

Figure 4:
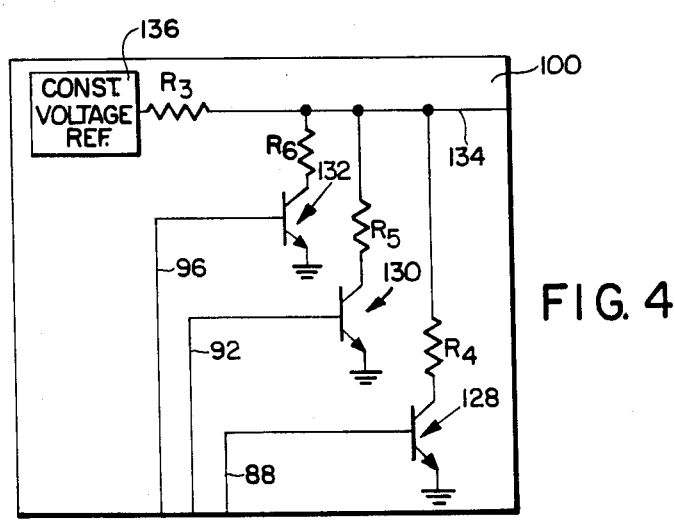
FIG. 4 is a schematic diagram of a portion of the analog multiplexer functionally shown in drawing FIG. 1.

As shown in drawing FIG. 4, the outputs from switch position decoding module 72 on paths 88, 92 and 96 are also applied to the input or base of transistors 128, 130 and 132, respectively, within analog multiplexer 100. When the exposure control system is in its energized state, one of said transistors is always in a conducting state and the other two are always in a non-conducting state as determined by the position of lighten/darken trim switch 68 (FIG. 1). Transistors 128, 130 and 132 are placed in their conducting states when trim switch 68 is placed in either its nominal, (−) or (+) switch positions, respectively. One of three possible conventional voltage divider networks is established by transistors 128, 130 or 132 in conjunction with resistors $R_3$ and $R_4$, $R_5$ or $R_6$ when any one of these transistors conducts. The magnitude of the output voltage from multiplexer 100 on path 134 is determined by the particular transistor that conducts and its associated voltage divider network. Constant reference voltage 136 is divided by resistors $R_3$ and $R_4$ when transistor 128 conducts, by resistors $R_3$ and $R_5$ when transistor 130 conducts and by resistors $R_3$ and $R_6$ when transistor 132 conducts. The magnitude of the voltage appearing at the output of multiplexer 100 on path 134 with respect to system ground is equal to the product of the magnitude of constant reference voltage 136 times $$\frac{R_4}{R_3 + R_4}, \frac{R_5}{R_3 + R_5} \text{ or } \frac{R_6}{R_3 + R_6}.$$

In operation, switch 138 (FIG. 1) is manually actuated to its closed position, thereby initiating an exposure controlled picture taking sequence. Upon initiation of the exposure control sequence and prior to the start of an exposure interval or actual shutter blade movement, a signal representative of pre-exposure ambient light generated by ambient light detector and integrator 56 is routed to exposure control electronics 52 through path 140 indicating the ambient light level of the scene to be photographed. The exposure control system of camera 10 has high and low light level modes of operation. In a high light level scene or fill flash mode, the electronic flash is fired to supplement ambient light for the purpose of eliminating shadows such as those that might otherwise be caused by subject backlighting. In a low light level mode, which is the standard flash mode, the electronic flash supplies a relatively large portion of total scene light. A photographic camera employing such a dual mode exposure control system is more fully described in U.S. Pat. No. 4,255,030 to B. JOHNSON ET AL. In a high ambient light level or fill flash mode, the electronic flash contributes approximately 25% of the required exposure value, whereas in a low ambient light level mode the flash contributes most or all of the required exposure value.

The exposure control system fires the flash based upon subject distance information determined prior to the exposure interval or integrated ambient light information accumulated during the exposure interval. The mode of operation, high or low ambient light level, determines how the distance information is used or what percentage of total exposure is reached by the ambient integrator in order to fire the flash. The exposure control electronics 52 processes the gathered scene information, of distance and integrated ambient light, and decides which of the two pieces of information to use for firing the flash. In both the high and low ambient modes of operation, the flash fire aperture is determined by how far into the shutter opening profile the flash fire command is given; the scanning aperture shutter 18 takes many milliseconds to translate from the initially closed position to the fully open position, and it is during this opening time that the scene distance and light level information generate the flash fire command.

Once the flash is fired, the strobe must be quenched at a flash integrator threshold corresponding to a desired percentage of total exposure that the flash will contribute to the subject. The mode of operation determines the percentage of flash. After the flash is quenched, any remaining ambient light needed to complete the exposure is obtained via reaching the end of exposure threshold with the ambient integrator. The ambient percentage used complements the flash percentage, and is determined by the mode of operation.

The electronic trim control recalibrates the ambient and strobe integration electronics by changing the threshold levels that are to be integrated to during exposure of the film. The resulting photograph is either overexposed (lightened) or underexposed (darkened) by the predetermined amount of trim control compensation. There are three integration thresholds affected by the electronic trim compensation, in order to obtain a balanced effect of lightening or darkening of both the subject and the background. The three affected thresholds are:(1) the ambient threshold for the flash fire command when the flash is fired based on ambient information;(2) the quench threshold; and (3) the end exposure threshold, to close the shutter, when the end exposure command is based on an ambient threshold being reached.

The method by which the electronic trim control recalibrates the integration threshold levels is as follows. The digital pulse train generated by ambient light detector and integrator 56 and light intensity to pulse converter 116 must accumulate in counter 114 to the magnitude of digital comparators 108, 110 or 112, depending on the position of the trim switch 68. If the flash has not yet been fired based on subject distance information, it will be fired at the appropriate digital threshold set by comparators 108, 110 or 112. Now, artificial light detector and integrator 58, being held in a reset state up until the firing of the flash, must integrate up to a magnitude established by analog comparator 146, as determined by the output of analog multiplexer 100 which is dependent on the position of trim switch 68. A strobe quench signal is generated by said comparator 146 which energizes quench tube 48 through path 54, thereby extinguishing light from electronic flash tube 46.

During the 1.5 millisecond interval of the flash firing, ambient digital pulse train counter 114 is blanked out from accumulating flash induced pulse counts, as more fully described in U.S. Pat. No. 4,255,030, supra. After artificial light from the flash is extinguished, said counter 114 continues to accumulate ambient pulse train counts until the magnitude of a set of digital comparators (not shown) parallel to comparators 108, 110 and 112 is reached, depending on the position of trim switch 68. If the exposure interval has not yet been terminated by other means (not described herein), it will be terminated at this time.

From the foregoing, therefore, it can be seen that the ambient and artificial light levels admitted to focal plane 16 of camera 10 can be simultaneously changed two-thirds stop above or below a particular nominal value by an electronic trim control that employs a single three position switch that can be readily manipulated by a camera 10 operator.

It will be apparent to those skilled in the art from the foregoing description of my invention that various improvements and modifications can be made without departing from its true scope. The embodiments described herein are merely illustrative and should not be viewed as the only embodiments that might encompass my invention.

What is claimed is:

1. An exposure control system for a camera having means for defining a film plane and an optical path for directing light from a scene onto photosensitive film located in the film plane, said exposure control system comprising:

a blade mechanism;

means for mounting said blade mechanism for displacement from an initial closed arrangement wherein said blade mechanism precludes scene light from being transmitted from the optical path to the film plane to an open arrangement wherein said blade mechanism defines a maximum size aperture to allow the passage of scene light to the film plane and then to a final closed arrangement wherein said blade mechanism again precludes scene light from being transmitted to the film plane;

drive means responsive to the actuation thereof for effecting the displacement of said blade mechanism from its initial closed arrangement to its said open arrangement and then to its final closed arrangement to define an exposure interval during which scene light is incident upon the film plane;

means for detecting and integrating substantially only the ambient scene light during the photographic exposure interval wherein said integrated ambient scene light is converted to a digital pulse count;

a flash discharge tube;

means for storing energy;

means for triggering said flash discharge tube at a select instant during said exposure interval so as to discharge the energy stored in said energy storage means through said flash discharge tube to provide an artificial flash of illumination;

means for detecting and integrating substantially only the artificial scene light during the photographic exposure interval wherein said integrated artificial scene light is converted to an analog voltage value; and control means responsive to said digital pulse count reaching a select value for actuating said drive means to effect the displacement of said blade mechanism from its said open arrangement to its said final closed arrangement and to said analog voltage value reaching a select level for terminating the flash of artificial illumination, said control means further comprising manually actuable unitary trim control means for simultaneously increasing or decreasing said select value of said digital pulse count at which said drive means is actuated to effect the displacement of said blade mechanism from its said open arrangement to its said final closed arrangement and said select level at which said flash of artificial illumination is terminated.

2. An exposure control system for a camera having means for defining a film plane and an optical path for directing light from a scene onto photosensitive film located in the film plane, said exposure control system comprising:

blade means for selectively unblocking and blocking the optical path to define an exposure interval;

a quench strobe;

photodetector means for determining whether a high or low ambient scene light condition exists prior to the commencement of an exposure interval and for detecting and integrating scene light in correspondence with the amount of scene light incident upon the film during the exposure interval;

analog and digital control means responsive to said photodetector means determination of the ambient scene light condition for defining a first exposure control mode for use in high ambient scene light conditions wherein the optical path blocking movement of said blade means is commenced responsive to the integration of scene light reaching a first predetermined value, or for a defining a second exposure control mode for use in low ambient scene light conditions wherein said strobe is fired and then quenched prior to the commencement of the optical path blocking movement of said blade means responsive to the integration of scene light reaching a second predetermined value; and manually actuable unitary trim control means for simultaneously electrically increasing or for simultaneously electrically decreasing said first and second predetermined values of integration.

3. The exposure control system of claim 2 wherein in said first exposure control mode said strobe is additionally fired and then quenched prior to the commencement of the optical path blocking movement of said blade means responsive to the integration of scene light reaching a third predetermined value, and said trim control means additionally includes means for electrically increasing or for electrically decreasing said third predetermined value of integration in simultaneous correspondence with the increasing or decreasing of said first and second predetermined values of integration.

4. The exposure control system of claim 2 wherein in said second exposure control mode said strobe is fired in response to the integration of scene light reaching a third predetermined value and then quenched in response to the integration of scene light reaching a fourth predetermined value and said trim control means additionally includes means for electrically increasing or for electrically decreasing said third and fourth values of integration in simultaneous correspondence with the increasing or decreasing of said first and second predetermined values of integration.

5. An electronic trim control for regulating film exposure in photographic apparatus of the type having means for defining a film plane and an optical path for transmitting light from a scene along the optical path to expose photosensitive film located in the film plane together with a system for controlling the firing of an electronic flash of the quench type, said apparatus comprising:

means for controlling the amount of scene light incident on the film plane, said scene light controlling means including a blade assembly movable along a predetermined path to define a range of apertures through which scene light must pass in reaching the film plane;

actuatable drive means for displacing said blade assembly between scene light blocking and unblocking positions to define an exposure interval;

first and second means for detecting and integrating scene light in correspondence with the scene light admitted to the film plane by said blade assembly during an exposure interval;

digital control means responsive to said first scene light detecting and integrating means for actuating said drive means to displace said blade assembly from its said unblocking position to its said blocking position so as to terminate said exposure interval and/or for firing said electronic flash;

analog control means reponsive to said second scene light detecting and integrating means to a selected light level for quenching the artificial light from said electronic flash; and manually actuatable means for simultaneously changing the light level at which the blade assembly drive means is actuated to its said blocking position and/or said electronic flash is fired, and the light level at which the artificial light from said electronic flash is quenched.

6. The apparatus of claim 5 further comprising:

ranging means for determining subject distance and for providing an electrical range signal indicative of subject distance; and means responsive to said electrical range signal for establishing an aperture size from said range of aperture sizes, for the purpose of firing the electronic flash, whereby said established aperture size corresponds to the distance that a particular scene being photographed is positioned from the camera.

7. The apparatus of claim 6 wherein said means for simultaneously changing said light levels includes a common voltage source that provides a plurality of different magnitude voltages and means for manually selecting a particular common voltage and said given levels are dependent upon the magnitude of a selected one of said different magnitude voltages.

8. The apparatus of claim 7 wherein said means for manually selecting a particular common voltage includes a manually actuatable electrical switch having a plurality of discrete switch positions and switch decoding means for generating an electrical signal representative of the particular switch position selected.

9. The apparatus of claim 8 wherein said means for changing the light level at which the blade assembly drive means is actuated to its said blocking position includes a digital comparator for establishing signals representative of scene light levels sensed by said first scene light detecting and integrating means and a digital multiplexer responsive to the electrical signals generated by said decoding means and to the signals established by said digital comparator for generating an electrical signal for initiating the actuation of said blade assembly to its said blocking position.

10. The apparatus of claim 8 wherein said means for changing the light level at which said electronic flash is quenched includes an analog multiplexer, responsive to the electrical signals generated by said switch position decoding means, for generating an electrical signal representative of a selected switch position and an analog comparator responsive to electrical signals representative of scene light levels established by said second scene light detecting and integrating means and to the electrical signals generated by said analog multiplexer for generating an electrical signal for quenching said electronic flash.

11. The apparatus of claim 5 wherein each of said first and second means for detecting and integrating scene light includes a photodiode.

* * * * *